United States Patent
Kim et al.

(10) Patent No.: US 10,481,470 B2
(45) Date of Patent: Nov. 19, 2019

(54) CAMERA USING LIGHT SOURCE HAVING SUBJECT EYE PROTECTION FUNCTION

(71) Applicant: MEERECOMPANY INC., Hwaseong-si (KR)

(72) Inventors: Byung Jun Kim, Yongin-si (KR); Sung Hyeok Jung, Osan-si (KR); Pil Ho Jung, Ansan-si (KR)

(73) Assignee: MEERECOMPANY INC., Hwaseong-si (KR)

( * ) Notice: Subject to any disclaimer, the term of this patent is extended or adjusted under 35 U.S.C. 154(b) by 0 days.

(21) Appl. No.: 16/386,769

(22) Filed: Apr. 17, 2019

(65) Prior Publication Data
US 2019/0324351 A1    Oct. 24, 2019

(30) Foreign Application Priority Data

Apr. 19, 2018 (KR) .......................... 10-2018-0045625
Apr. 24, 2018 (KR) .......................... 10-2018-0047105
Feb. 18, 2019 (KR) .......................... 10-2019-0018596

(51) Int. Cl.
*G03B 15/03* (2006.01)
*G03B 17/55* (2006.01)

(52) U.S. Cl.
CPC ............. *G03B 15/03* (2013.01); *G03B 17/55* (2013.01)

(58) Field of Classification Search
None
See application file for complete search history.

(56) References Cited

U.S. PATENT DOCUMENTS

| | | | |
|---|---|---|---|
| 2007/0024213 A1* | 2/2007 | Shteynberg | H05B 33/0815 315/291 |
| 2014/0285089 A1* | 9/2014 | Akahoshi | H05B 33/089 315/127 |
| 2016/0353533 A1* | 12/2016 | Gyoten | H05B 33/0845 |

FOREIGN PATENT DOCUMENTS

| | | |
|---|---|---|
| KR | 20080073072 | 8/2008 |
| KR | 20100098879 | 9/2010 |
| KR | 20140000078 | 1/2014 |
| KR | 20150076760 | 7/2015 |
| KR | 20160109681 | 9/2016 |
| KR | 20170081640 | 7/2017 |

* cited by examiner

*Primary Examiner* — Jany Richardson
(74) *Attorney, Agent, or Firm* — Cantor Colburn LLP

(57) ABSTRACT

Provided is a camera using a light source having a subject eye protection function. The camera includes a light source driver installed between a power supply and a light source for emitting light to a subject and configured to convert electric power supplied by the power supply to a pulse current, a light source driver controller configured to control the light source driver to be turned on or off such that the light source driver converts the electric power supplied by the power supply to the pulse current, a current measurement unit configured to measure the pulse current supplied to the light source, an amplitude controller configured to control an amplitude of the pulse current measured by the current measurement unit, a smoothing circuit configured to smooth the pulse current of which the amplitude is controlled by the amplitude controller, and a comparator controller configured to control the electric power supplied by the power supply to be interrupted in a case in which the smooth current smoothed by the smoothing circuit is greater than a preset threshold value.

13 Claims, 9 Drawing Sheets

FIG. 4
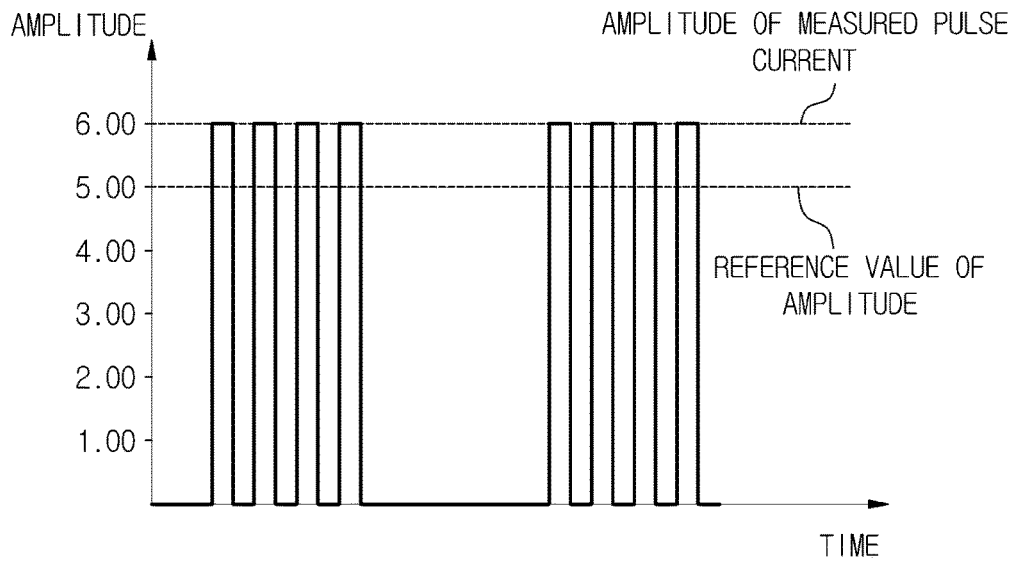
(a)
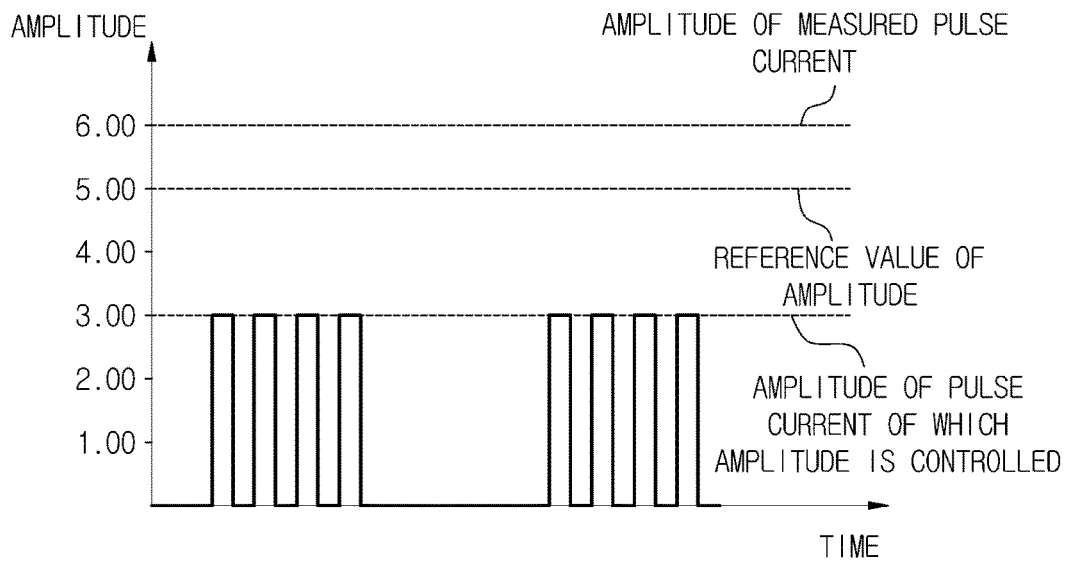
(b)

FIG. 5
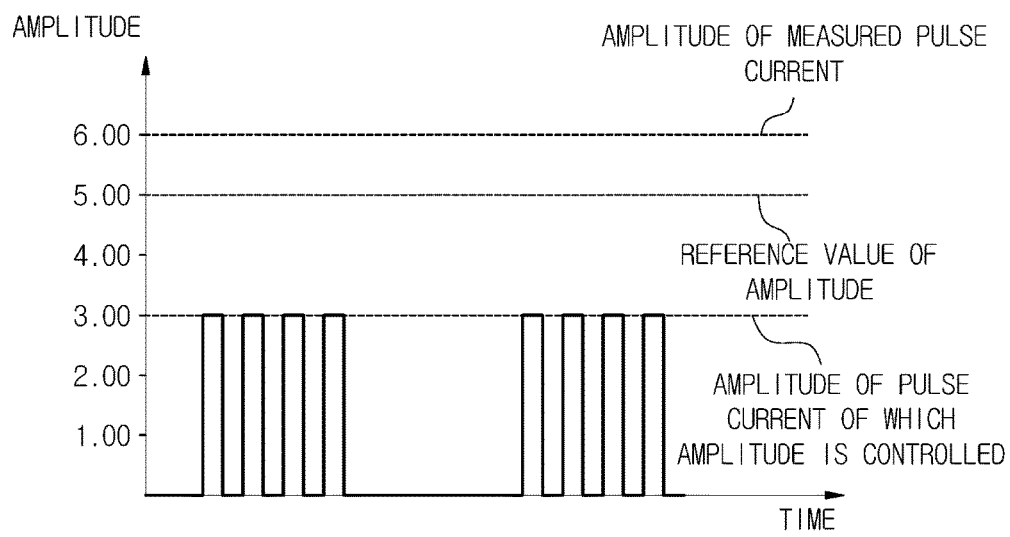
(a)
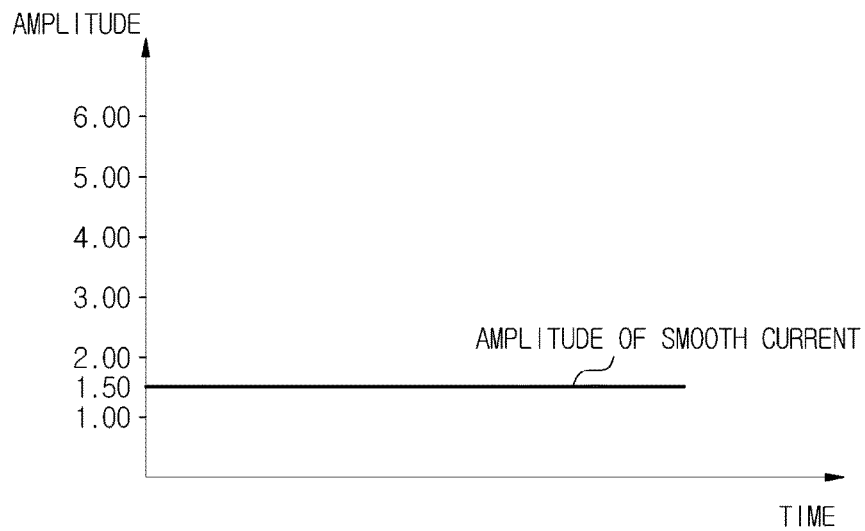
(b)

CAMERA USING LIGHT SOURCE HAVING SUBJECT EYE PROTECTION FUNCTION

BACKGROUND

1. Technical Field

The present invention relates to a camera using a light source having a subject eye protection function. More specifically, the present invention relates to a camera using a light source having a subject eye protection function, which is capable of preventing a risk of the eyes of a human or the like who is a subject from being damaged due to an over-current introduced into a light source while a camera using a light source, such as a time of flight (ToF) camera, operates.

2. Description of Related Art

A time of flight (ToF) method is a method of calculating a distance by measuring a flight time, that is, a time for which light is emitted, reflected, and returned, and a ToF camera is a camera configured to capture an image of a depth to an object using the ToF method.

Such a ToF camera is a core technical device which may be applied to various fields such as a quad copter, an autonomous vehicle, motion recognition control, virtual reality, a game, three-dimensional (3D) modeling, and human-robot interaction.

Meanwhile, as improvement of quality of a depth and a signal measured by the ToF camera is required, a light source having a higher performance is required. Although a higher current should be supplied to meet the performance for an optical power density, the optical power density is limited to meet an industrial safety standard, and products are also designed to meet the standard. However, the product may abnormally operate due to a lifetime of a component configured to control a board or error in a facility environment. In this case, the light source, which is constantly controlled by a controller, abnormally operates, and thus there is a problem in that the eyes of a human, who is a subject, are harmed and damaged.

FIG. 1 is a view illustrating a subject eye protection apparatus of a conventional ToF camera for solving the problem.

Referring to FIG. 1, the subject eye protection apparatus of the conventional ToF camera includes a light source 10, a power supply 20, a light source driver 30, a light source driver controller 40, a current measurement unit 50, and a comparator 90.

Such a conventional technology uses a method in which the current measurement unit 50 measures a current input to the light source 10, that is, an output current of the light source driver 30, and the comparator 90 performs a current interruption process on the basis of the measured value. That is, the comparator 90 interrupts a current supplied to the light source 10 when the measured current value is higher than a set reference current value.

However, according to the conventional method, since the current measured by the current measurement unit 50 is transmitted to the comparator 90 without being changed, in a case in which the measured current value exceeds a range in which the comparator 90 may operate, there is problem in that a malfunction may occur.

PRIOR-ART DOCUMENTS (Patent Documents)

Korean Patent Laid-Open Publication No. 10-2017-0081640 (Publication Date: Jul. 12, 2017, Title: APPARATUS AND METHOD FOR PROTECTING A USER FROM BLUE LIGHT RADIATION)

Korean Patent Laid-Open Publication No. 10-2016-0109681 (Publication Date: Sep. 21, 2016, Title: METHOD AND DEVICE FOR IRRADIATING LIGHT USED TO CAPTURE IRIS)

Korean Patent Laid-Open Publication No. 10-2015-0076760 (Publication Date: Jul. 7, 2015, Title: TOF CAMERA FOR VEHICLE AND METHOD FOR DRIVING THEREOF)

SUMMARY

1. Technical Problem

A technical objective of the present invention is to provide a camera using a light source having a subject eye protection function, which is capable of preventing a risk of the eyes of a human or the like who is a subject from being damaged due to an over-current introduced into a light source while a camera using a light source, such as a time of flight (ToF) camera, operates.

2. Solution to Problem

A camera using a light source having a subject eye protection function according to the present invention includes a light source driver installed between a power supply and a light source configured to emit light to a subject and configured to convert electric power supplied by the power supply to a pulse current so that the pulse current is supplied to the light source, a current measurement unit configured to measure the pulse current supplied to the light source, an amplitude controller configured to control an amplitude of the pulse current measured by the current measurement unit, a smoothing circuit configured to smooth the pulse current of which the amplitude is controlled by the amplitude controller, and a comparator controller configured to control the electric power supplied by the power supply to be interrupted in a case in which the smooth current smoothed by the smoothing circuit is greater than a preset threshold value.

In the camera using a light source having a subject eye protection function according to the present invention, the amplitude controller may compare the amplitude of the pulse current measured by the current measurement unit with a preset amplitude reference value and, in a case in which the amplitude of the pulse current is greater than the amplitude reference value, convert the amplitude of the pulse current to the amplitude reference value or less.

The camera using a light source having a subject eye protection function according to the present invention may further include a system controller configured to receive state information, which includes comparison information between the smooth current and the threshold value, from the comparator controller and monitor the state information.

In the camera using a light source having a subject eye protection function according to the present invention, the system controller may control the state information to be provided to a manager through a status information display or manager terminal.

In the camera using a light source having a subject eye protection function according to the present invention, in a case in which the system controller receives the state information of the smooth current being greater than the threshold value, the system controller may push alarm information for notifying an emergency situation with the state information to a designated manager terminal.

In the camera using a light source having a subject eye protection function according to the present invention, the threshold value may be changeable according to various situations.

In the camera using a light source having a subject eye protection function according to the present invention, in a situation in which an amplitude of the smooth current increases, the threshold value may be changed to increase, and in a situation in which the amplitude of the smooth current decreases, the threshold value may be changed to decrease.

In the camera using a light source having a subject eye protection function according to the present invention, the system controller may be electrically connected to the light source, the light source may be mounted on a light source board, the light source board may be mounted on a heat sink, and the heat sink may be coupled to a control board through a coupling member, wherein the system controller may be mounted on the control board.

In the camera using a light source having a subject eye protection function according to the present invention, the light source board may further include at least one of an optical sensor and a temperature sensor.

In the camera using a light source having a subject eye protection function according to the present invention, the heat sink may also serve as a lens base on which a lens module, on which light reflected by the subject is incident, is allowed to be mounted.

In the camera using a light source having a subject eye protection function according to the present invention, the light source board may be mounted on one side of the heat sink configured to also serve as the lens base, and a plurality of protrusions may be formed on the other side thereof.

In the camera using a light source having a subject eye protection function according to the present invention, the system controller may receive information of a temperature from the temperature sensor to control the power supply.

In the camera using a light source having a subject eye protection function according to the present invention, the system controller may compare a clock signal for driving the light source driver with the pulse current measured by the current measurement unit to control the power supply.

3. Advantageous Effects

According to the present invention, there is an advantageous effect of providing a camera using a light source having a subject eye protection function, which is capable of preventing a risk of the eyes of a human or the like who is a subject from being damaged due to an over-current introduced into a light source while a camera using a light source, such as a time of flight (ToF) camera, operates. In addition, since a reference value for interrupting an over-current is adjustable, accurate subject information can be sensed, and safety can also be further improved.

BRIEF DESCRIPTION OF DRAWINGS

FIG. 4 is an example waveform diagram for describing an amplitude control process performed by an amplitude controller according to one embodiment of the present invention.

FIG. 5 is an example waveform diagram for describing a process in which a pulse current of which an amplitude is controlled is smoothed as a smooth current by a smoothing circuit according to one embodiment of the present invention.

Figure 1:
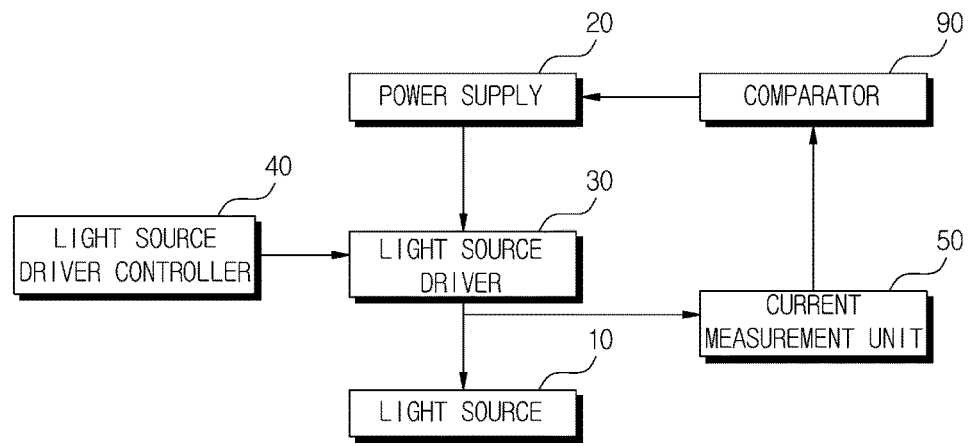
FIG. 1 is a view illustrating a subject eye protection apparatus of a conventional time of flight (ToF) camera.

| (Reference Characters) | |
|---|---|
| 1: camera using light source having subject eye protection function | |
| 2: heat sink/lens base integrated module | |
| 3: temperature sensor | 4: heat sink |
| 5: coupling member | 6: lens module |
| 7: lens base | 8: control board |
| 9: circuit element | 10: light source |
| 20: power supply | 30: light source driver |
| 40: light source driver controller | |
| 50: current measurement unit | |
| 60: amplitude controller | 70: smoothing circuit |
| 80: comparator/controller | 90: lens driver |
| 100: system controller | 110: status information display |
| 120: optical sensor | 200: manager terminal |

DETAILED DESCRIPTION OF EMBODIMENTS

In embodiments according to the concept of the present invention disclosed in the specification, specific structural and functional descriptions are directed only to providing examples for describing the embodiments of the present invention, and the embodiments according to the concept of the present invention may be implemented in various forms, and thus the present invention is not limited to the embodiments described in the specification.

While the embodiments according to the concept of the present invention may be modified in various ways and have various alternative forms, examples of the embodiments are shown in the drawings and described in detail below. There is no intent to limit the present invention to the particular forms disclosed. On the contrary, the present invention covers all modifications, equivalents, and alternatives falling within the spirit and scope of the present invention.

It should be understood that, although the terms first, second, and the like may be used herein in reference to elements of the present invention, such elements are not to be construed as limited by the terms. The terms are only used to distinguish one element from another. For example, a first element could be termed a second element, and a second element could be termed a first element without departing from the scope of the present invention.

It should be understood that, when an element is referred to as being "connected" or "coupled" to another element, the element may be directly connected or coupled to another element, or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," and the like).

The terminology used herein to describe the embodiments of the present invention is not intended to limit the scope of the present invention. The articles "a," "an," and "the" are singular in that they have a single referent, however the use of the singular form in the present document does not preclude the presence of more than one referent unless the context clearly indicates otherwise. It should be further understood that the terms "comprise," "comprising," "include," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms including technical and scientific terms used herein should be interpreted as is customary in the art to which the present invention belongs. It should be further understood that terms in common usage should also be interpreted as is customary in the relevant art and not in an idealized or overly formal sense unless expressly so defined herein.

Hereinafter, exemplary embodiments of the present invention will be described with reference to the accompanying drawings.

Figure 2:
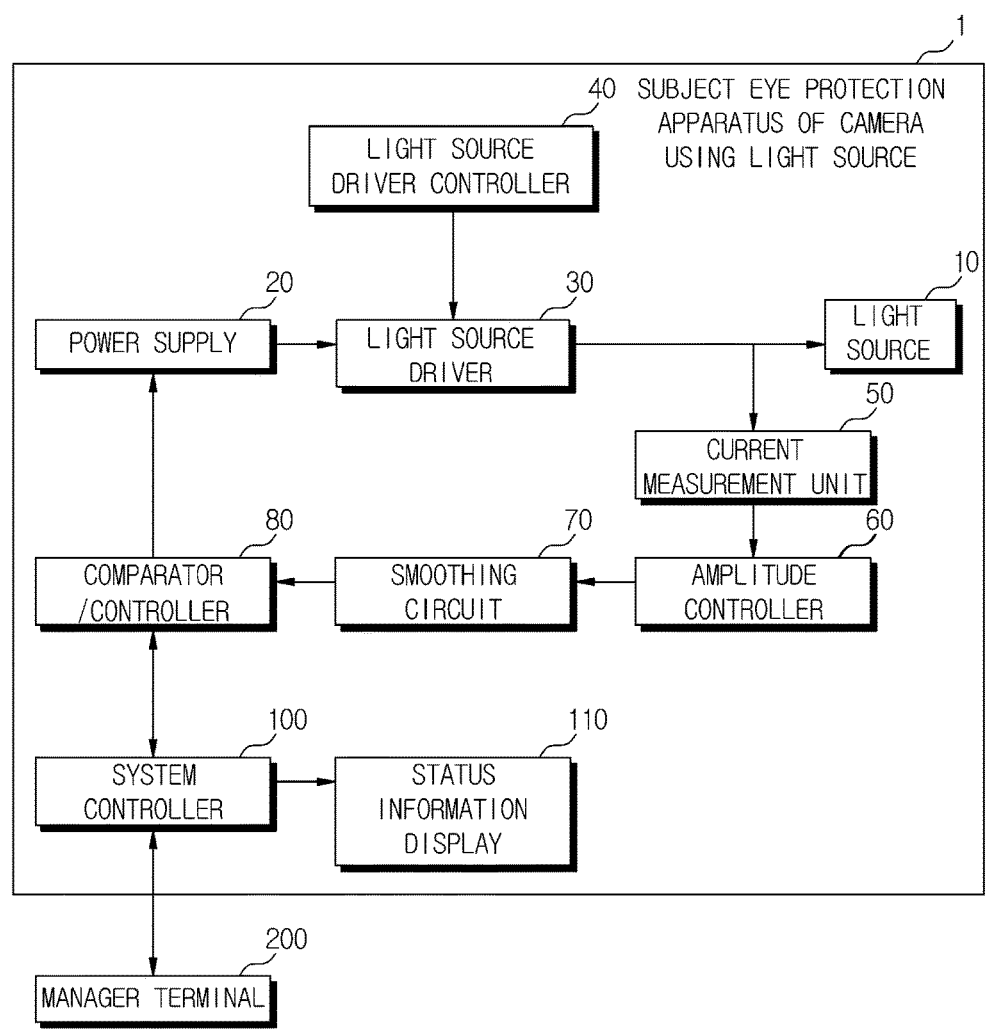
FIG. 2 is a view illustrating a camera using a light source having a subject eye protection function according to one embodiment of the present invention.

FIG. 2 is a view illustrating a camera using a light source and having a subject eye protection function according to one embodiment of the present invention.

Referring to FIG. 2, a camera 1 using a light source and a subject eye protection function according to one embodiment of the present invention includes a light source 10, a power supply 20, a light source driver 30, a light source driver controller 40, a current measurement unit 50, an amplitude controller 60, a smoothing circuit 70, a comparator/controller 80, a system controller 100, and a status information display 110.

As an example, a camera according to one embodiment of the present invention may be a time of flight (ToF) camera or a ToF camera, but is not limited thereto and may be any camera requiring the light source 10 during an operation.

Before the embodiment of the present invention is described, a ToF camera will be briefly described below.

A ToF method is a method of calculating a distance by measuring a flight time, that is, a time required for light to be emitted, reflected, and returned. A ToF camera is a camera using the ToF method to obtain an image of a depth to an object, which is referred to as an image implementing object-depth information. Such a ToF camera is a core technical device which may be applied to various fields such as a quad copter, an autonomous vehicle, motion recognition control, virtual reality, a game, three-dimensional (3D) modeling, and human-robot interaction.

The light source 10 serves a function of outputting light for operating a camera, for example, for obtaining depth information.

As described in the related art section, since a depth measured by the ToF camera and a signal thereof requires a high quality, the light source 10 requires a higher performance. Although a higher current should be supplied to meet performance required for an optical power density, the optical power density is required to meet an industrial safety standard, and products are also designed to meet the standard. However, the product may abnormally operate due to a lifetime of a component configured to control a board, or due to an error in a facility environment. In this case, the light source 10, which is constantly controlled by a controller, abnormally operates, and the eyes of a human may be harmed and damaged in a case in which a subject is a human. One embodiment of the present invention uses a set of the following components to prevent a risk to damage the eyes of a human who is a subject, when an over-current is introduced into the light source 10 and then a product abnormally operates.

The power supply 20 serves a function of supplying electric power to operate the light source 10. As will be described below, the power supply 20 has a function of interrupting supply of electric power according to a control signal from the comparator/controller 80.

The light source driver 30 is installed between the light source 10, which is configured to output light so as to operate a camera, and the power supply 20. The light source driver 30 serves a function of converting electric power supplied by the power supply 20 to a pulse current and supplying the pulse current to the light source 10. As an example, the light source driver 30 may include switching elements such as a field effect transistor (FET). As described above, in order to improve sensing performance of the ToF camera, a value of a current supplied to the light source should be increased so as to increase an optical power density. Here, since the pulse driving method is used, there is an advantage in that an instantaneous optical output value is increased, and in general a stable optical power density is supplied due to an off-period in which a current is not supplied.

The light source driver controller 40 serves a function of controlling the light source driver 30 to be turned on or off such that the light source driver 30 converts electric power supplied by the power supply 20 to a pulse current being supplied to the light source 10. As an example, in a case in which the light source driver 30 is a switching element such as an FET, the light source driver controller 40 may control an operation of the light source driver 30 using a method of inputting a pulse modulation signal to a gate terminal which is a control terminal of the FET. Thus, the light source driver 30 supplies a pulse current to the light source 10 according to the control of the light source driver controller 40. On- and off-periods of the pulse current are clearly distinguished, and a significant current flows in the on-period. An amount of optical energy generated per time is restricted through the off-period because a significant amount of optical energy is generated in the on-period. Therefore, in a case in which a problem occurs on a control circuit (for example, short circuit), accumulated energy increases due to a continuous wave (CW), a situation, in which the eyes of a human (who is a subject) may be damaged due to the increased energy, may occur. In order to solve such a problem, a protection circuit including the amplitude controller 60, the smoothing circuit 70, the comparator/controller 80, and the like may be used to protect the eyes of a human (for eye safety).

The current measurement unit 50 serves a function of measuring a pulse current being supplied from the light source driver 30 to the light source 10 and transmitting a value of the pulse current to the amplitude controller 60.

The amplitude controller 60 serves a function of controlling an amplitude of a pulse current measured by the current measurement unit 50.

FIG. 4 is an example waveform diagram for describing an amplitude control process performed by the amplitude controller 60 according to one embodiment of the present invention. As an example, referring to FIG. 4, when an amplitude of a pulse current measured by the current measurement unit 50 is compared with a preset amplitude reference value, 1) in a case in which the amplitude of the pulse current is greater than the amplitude reference value, the amplitude controller 60 may convert the amplitude of the pulse current to the amplitude reference value or less, and 2) in a case in which the amplitude of the pulse current is equal to or less than the amplitude reference value, the amplitude controller 60 may bypass the pulse current to the smoothing circuit 70 without changing the pulse current. The reason why the amplitude controller 60 decreases the pulse amplitude which is greater than the predetermined reference value is as follows. In the case in which the pulse amplitude exceeds the reference value, since a value of a current smoothed by the smoothing circuit is so large, it is difficult for the comparator/controller 80 to compare the current value with the reference value. Accordingly, in order to accurately operate the comparator/controller 80, a pulse amplitude is necessary to be controlled in advance according to the reference value of the amplitude controller 60. In addition, since intensities of current set to the light source 10 are different from products to products, it is difficult for a rated current (which may be handled by the comparator/controller 80) to be varied according to different boards having different intensities of current. Accordingly, after a predetermined reference amplitude value is set, when a measured current has an amplitude which may be handled by the comparator/controller 80, the measured current is bypassed, and when the amplitude is greater than the reference amplitude value, the amplitude is reduced to a desired amplitude so that the components of the protection circuit may be commonly used.

The smoothing circuit 70 serves a function of smoothing a pulse current of which an amplitude is controlled by the amplitude controller 60.

In FIG. 5, an example waveform diagram for describing a process in which a pulse current (of which an amplitude is controlled) is smoothed as a smooth current by the smoothing circuit 70 is illustrated.

As illustrated in (a) of FIG. 5, in a case in which an amplitude of a pulse current measured by the current measurement unit 50 is greater than a predetermined amplitude reference value, the amplitude controller 60 controls the amplitude of the pulse current to be changed to a pulse with a decreased amplitude. Next, as illustrated in (b) of FIG. 5, the pulse current with the decreased amplitude is changed to a signal having a voltage value which is less than that of a pulse with the amplitude controlled by the smoothing circuit 70. The changed signal as described above is compared with a reference value by the comparator/controller 80.

In a general case in which a problem occurs on a circuit, a CW is generally generated due to an electrical short circuit. When a product is designed, such a point is considered and a short test is performed to set a reference value used for determining whether a short circuit occurs, and the reference value set to the comparator/controller 80 is compared with a signal provided by the smoothing circuit 70 later to determine whether a short circuit has occurred.

In a case in which a smooth current smoothed by the smoothing circuit 70 is greater than a preset threshold value of an over-current, the comparator/controller 80 performs a function of controlling electric power supplied by the power supply 20 to be interrupted. As a specific example, in a case in which a smooth current is greater than a threshold value of an over-current, the comparator/controller 80 may control the power supply 20 to not output electric power.

The system controller 100 serves a function of receiving state information including comparison information between a smooth current and a threshold value of an over-current from the comparator/controller 80, monitoring the state information, and building a database for the state information in real time.

As an example, the system controller 100 may control state information to be provided to a manager and the like through the status information display 110 including a monitor.

As an example, the system controller 100 may respond to a request from a pre-designated manager terminal 200 to control state information to be provided to the manager terminal 200.

As an example, in a case in which state information received from the comparator/controller 80 shows that a smooth current is greater than a threshold value of an over-current, that is, in a situation in which the smooth current may harm a user, the system controller 100 may be configured to push alarm information for notifying the designated manager terminal 200 of an emergency situation with the state information.

Figure 3:
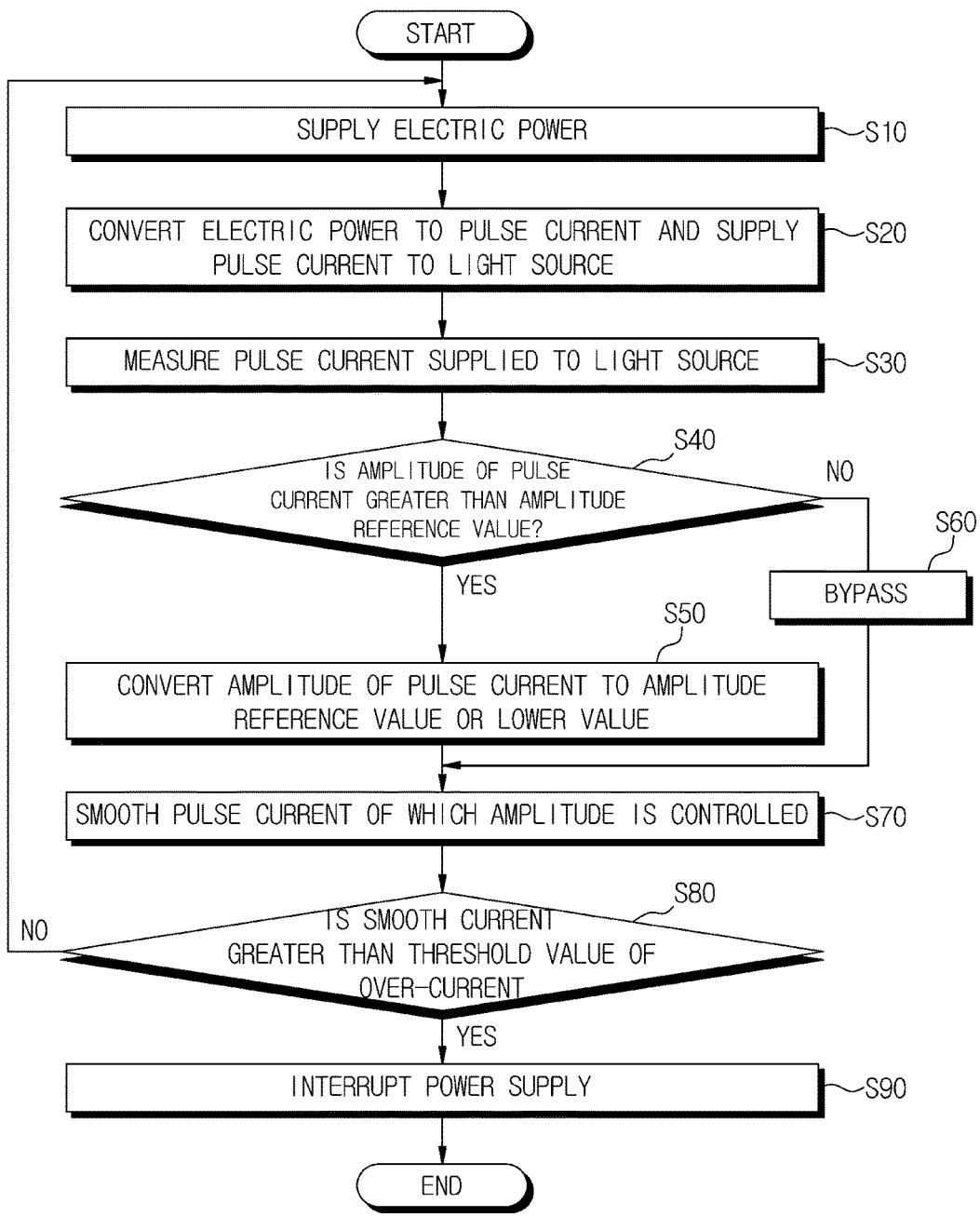
FIG. 3 is a view for describing a specific example operation of the camera using a light source having a subject eye protection function according to one embodiment of the present invention.

Further, according to one embodiment of the present invention, an example of a specific operation of the camera 1 using a light source having a subject eye protection function will be described, referring to FIG. 3. FIG. 3 shows only one example operation, and one embodiment of the present invention is not limited thereto.

Referring to FIG. 3, in an operation S10, a process in which the power supply 20 supplies electric power to the light source driver 30 at an initial operation stage of a product is performed.

In an operation S20, a process, in which the light source driver 30 converts the electric power supplied by the power supply 20 to a pulse current by the light source driver controller 40 and supplies the pulse current to the light source 10, is performed. Here, an intensity of output light of the light source 10 is proportional to an intensity of the pulse current, for example, an amplitude thereof.

In an operation S30, a process is performed in which the current measurement unit 50 measures the pulse current supplied from the light source driver 30 to the light source 10 and transmits a result thereof to the amplitude controller 60.

In an operation S40, a process in which the amplitude controller 60 compares an amplitude of a pulse current measured by the current measurement unit 50 with a preset amplitude reference value is performed. As a result, in the operation S40, 1) in a case in which the amplitude of the pulse current is greater than the amplitude reference value, an operation S50 is performed, and 2) in a case in which the amplitude of the pulse current is equal to or less than the amplitude reference value, an operation S60 is performed.

In the operation S50, a process is performed in which the amplitude controller 60 converts the amplitude of the pulse current (which is an output of the light source driver 30 and is received from the current measurement unit 50) to the amplitude reference value or less than that and transmits the converted amplitude of the pulse current to the smoothing circuit 70. The amplitude control for the pulse current performed by the amplitude controller 60 has been described above with reference to FIG. 4.

In the operation S60, a process is performed in which the amplitude controller 60 bypasses the pulse current to the smoothing circuit 70, since the amplitude of the pulse current is equal to or less than the amplitude reference value so that there are no difficulties in comparison and control operations of the comparator controller, and a process in which the amplitude is decreased is not needed.

In an operation S70, a process is performed in which the smoothing circuit 70 smooths the pulse current of which the amplitude is controlled by the amplitude controller 60. The process in which the pulse current is smoothed as a smooth current by the smoothing circuit 70 was described above with reference to FIG. 5.

In an operation S80, a process in which the comparator/controller 80 compares the smooth current smoothed by the smoothing circuit 70 with a preset threshold value of an over-current is performed. As the result, in the operation S80, 1) in a case in which the smooth current is greater than the threshold value of the over-current, an operation S90 is performed, and 2) in a case in which the smooth current is equal to or less than the threshold value of the over-current, the operation S10 is performed to continuously supply the electric power without performing an additional control operation.

The operation S90 is performed at a state in which the smooth current is greater than the threshold value of the over-current. When this state is ignored, the light source 10 emits high output light capable of damaging the eyes of a subject since an excessive intensity of over-current is supplied to the light source 10. Accordingly, in the operation S90, a process is performed, in which the comparator/controller 80 controls the electric power supplied by the power supply 20 to be interrupted. As an example, in the operation S90, the comparator/controller 80 may control the power supply 20 to not output electric power. When the above control is performed, electric power is also not supplied to the light source driver 30, and thus a current is not input to the light source 10 so that light output by the light source 10 is interrupted.

Figure 6:
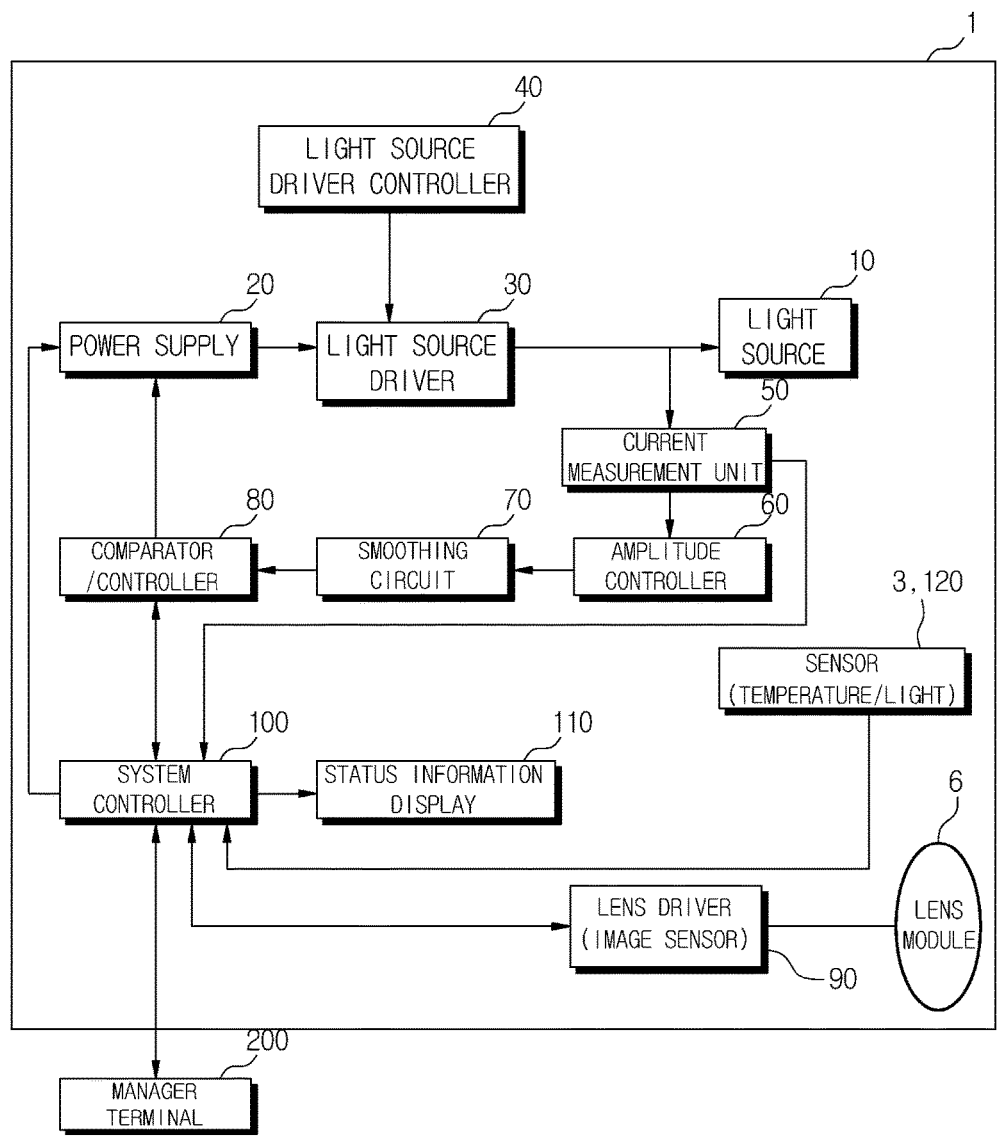
FIG. 6 is a view illustrating a camera using a light source having a subject eye protection function according to another embodiment of the present invention.

FIG. 6 is a view illustrating a camera using a light source having a subject eye protection function according to another embodiment of the present invention. A basic configuration, a function, and an operation are similar to those of the embodiment of FIG. 2, and main differences therefrom will be described below.

In a camera using a light source, information of a subject is sensed in various environments. As an example, in a case in which the camera is exposed to an outdoor environment instead of an indoor environment, light with a high intensity which is greater than that of light in the indoor environment should be emitted to a subject for more accurate sensing. Further, in order to sense a subject which is farther away from the camera, light with a higher intensity should be emitted. Conversely, when a subject is close to the camera, light with a lower intensity should be emitted. In order to determine various external conditions, the camera according to the present invention includes an optical sensor, such as a photodiode, to analyze an optical wavelength band and actively determine a condition of the camera. When it is determined that high intensity light should be emitted, an amplitude value of a smoothed current may increase, and accordingly, a reference value is changed to increase even a threshold value of an over-current, which is a safety reference value. Conversely, it is determined that low intensity light should be emitted, an amplitude value of a smoothed current decreases, and accordingly, a reference value is changed to decrease even a threshold value of the over-current.

Figure 7:
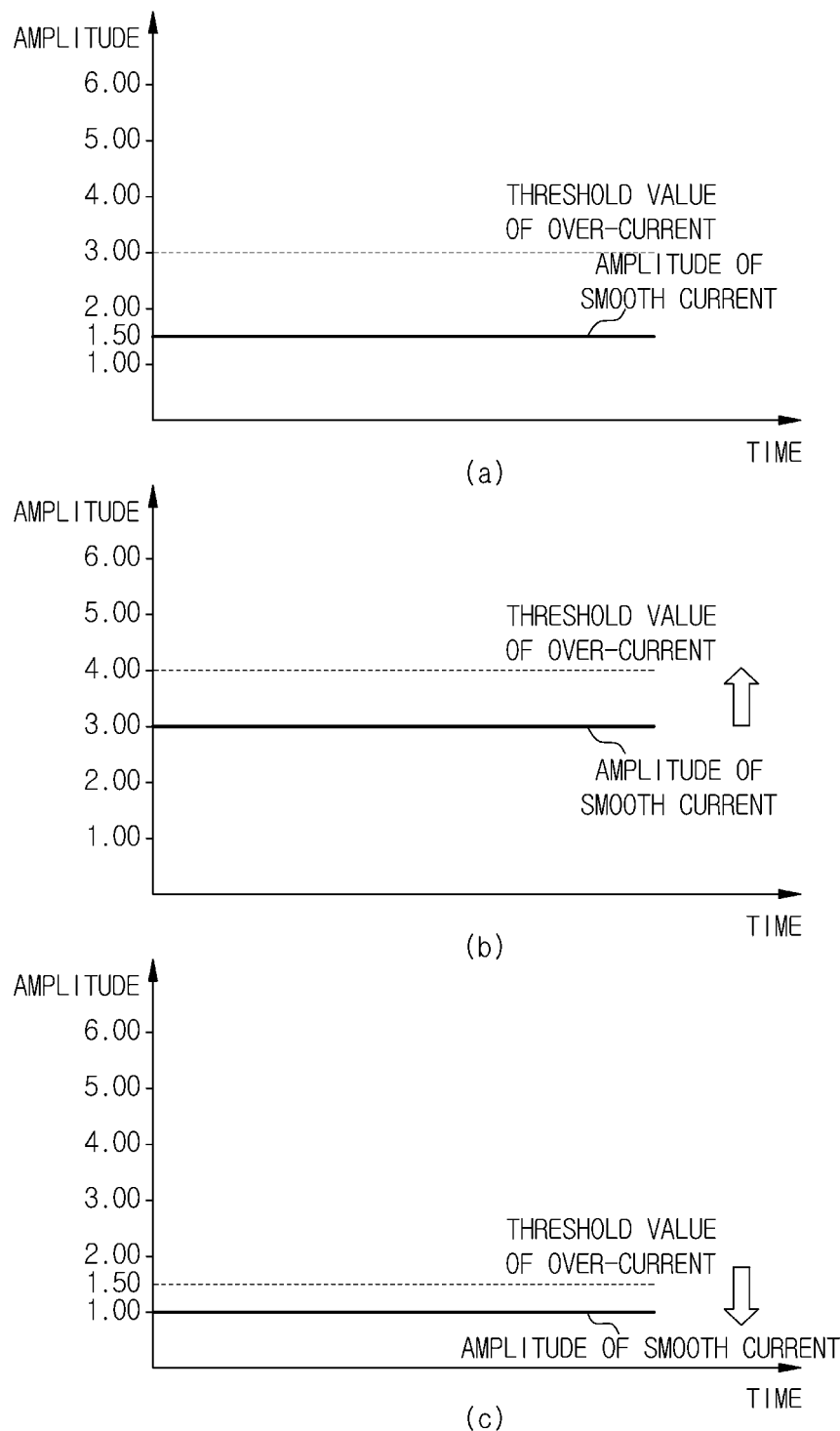
FIG. 7 is a waveform diagram for describing an example in which a threshold value of an over-current, which is a reference value of a comparator/controller, is changed according to an external condition in a case in which a current which is smoothed by a smoothing circuit is compared with a threshold value of an over-current according to another embodiment of the present invention.

FIG. 7 is a waveform diagram for showing an example in which a reference value of a threshold value of an over-current according to FIG. 6 is changed. A waveform diagram of (a) of FIG. 7 shows an amplitude of a smooth current and a threshold value of an over-current according thereto in a case in which a camera operates in an interior. A waveform diagram of (b) of FIG. 7 shows an amplitude of a smooth current and a threshold value of an over-current according thereto in a case in which the camera operates in an exterior. Since light should be emitted in the exterior than the interior, the amplitude of the smooth current of (b) of FIG. 7 is greater than that of (a) of FIG. 7. Accordingly, since the amplitude of the smooth current increases, the threshold value of the over-current which is a reference value is also changed to be increased, and thus the camera may not incorrectly operate and may more accurately sense information of a subject even in the outdoor environment. Conversely, although the camera is installed in the interior, for example, in a case in which a subject, such as an animal, approaches the camera, an amplitude of a smooth current is decreased and a threshold value of an over-current which is a safety reference value is also set to be decreased to protect the subject from excessive light, as illustrated in (c) of FIG. 7.

According to FIG. 6, a system controller 100 receives and analyzes information measured by an optical sensor 120 and controls a reference value of a comparator/controller 80 to be changed. In addition, the system controller 100 may analyze image information of a subject obtained through a lens module 6 and a lens driver 90 instead of the separate optical sensor 120 and control the reference value of the comparator/controller 80 to be changed. The comparator/controller 80 compares the controlled and changed reference value (a threshold value of an over-current) with a value of an amplitude of a smooth current provided from the smoothing circuit 70. When the value of the amplitude of the smooth current is greater than the threshold value of the over-current which is the reference value, the comparator/controller 80 controls a power supply 20 to not supply electric power any more. In addition, when the power supply 20 cannot supply electric power any more, the system controller 100 may control the lens driver 90 to not operate any more to prevent an electric power loss problem.

In the embodiment according to FIG. 6, a temperature sensor 3, such as a thermistor, is further included to provide an additional protection function to the camera using a light source. More specifically, in a case in which light with a higher intensity is emitted, a large amount of thermal energy may be generated around a light source. When the thermal energy is continuously accumulated, circuit elements may be damaged. In order to solve such a problem, the temperature sensor 3 is disposed around the light source, the system controller 100 receives and analyze temperature information. When a temperature is higher than a set temperature according to a set time, the system controller 100 controls the power supply 20 to not supply electric power any more.

In addition, the system controller 100 compares a clock signal (applied to a light source driver controller 40 to generate a pulse current) with a waveform of an actual pulse current measured by a current measurement unit 50. When shapes of both pulses are different, it may be determined that an abnormal pulse current is supplied to the light source, and accordingly the power supply 20 may be controlled to not supply electric power. Thus, an additional protection function may be provided.

Figure 8:
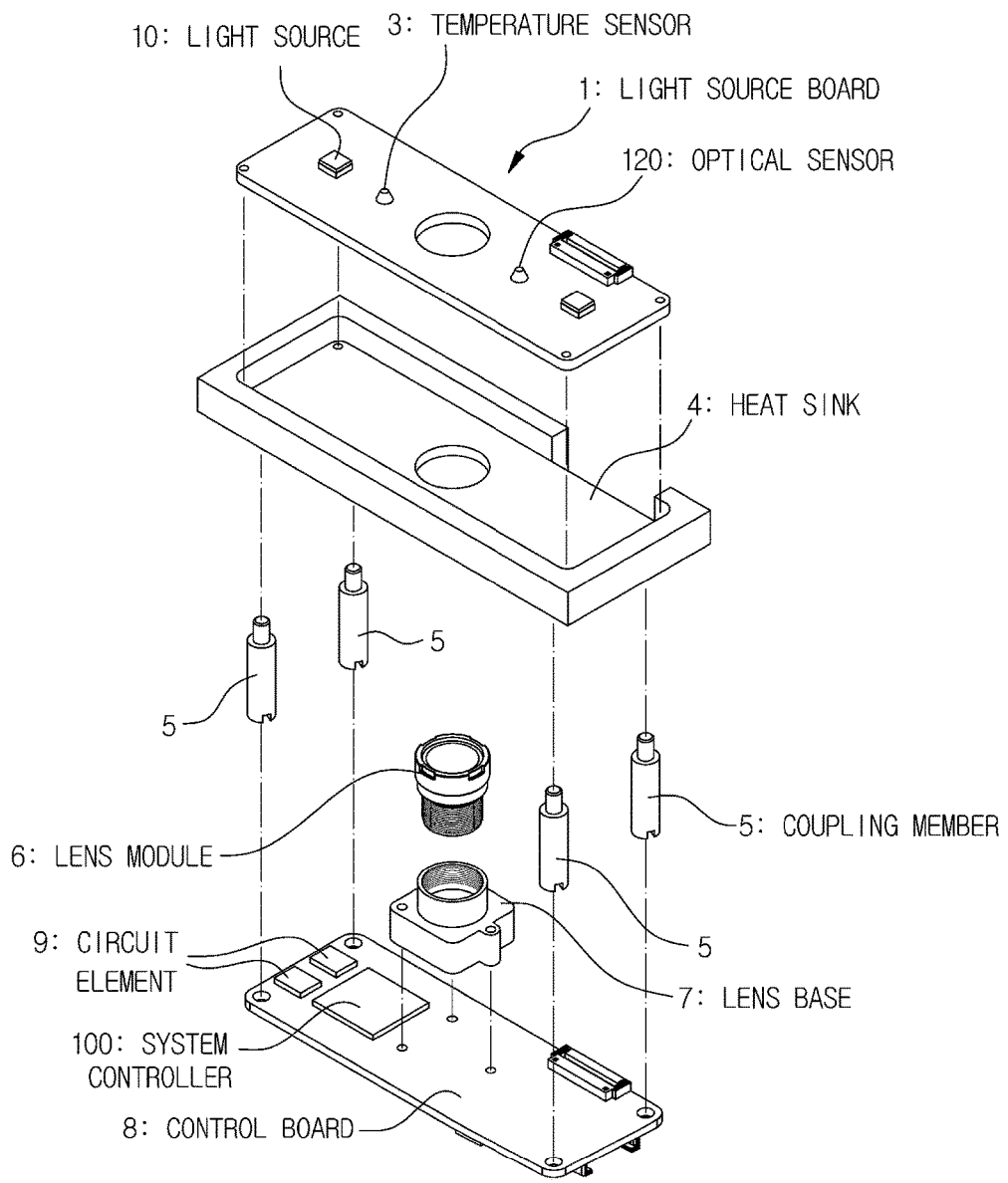
FIG. 8 is an exploded perspective view illustrating one example of the camera using a light source having a subject eye protection function according to one embodiment of the present invention.
Figure 9:
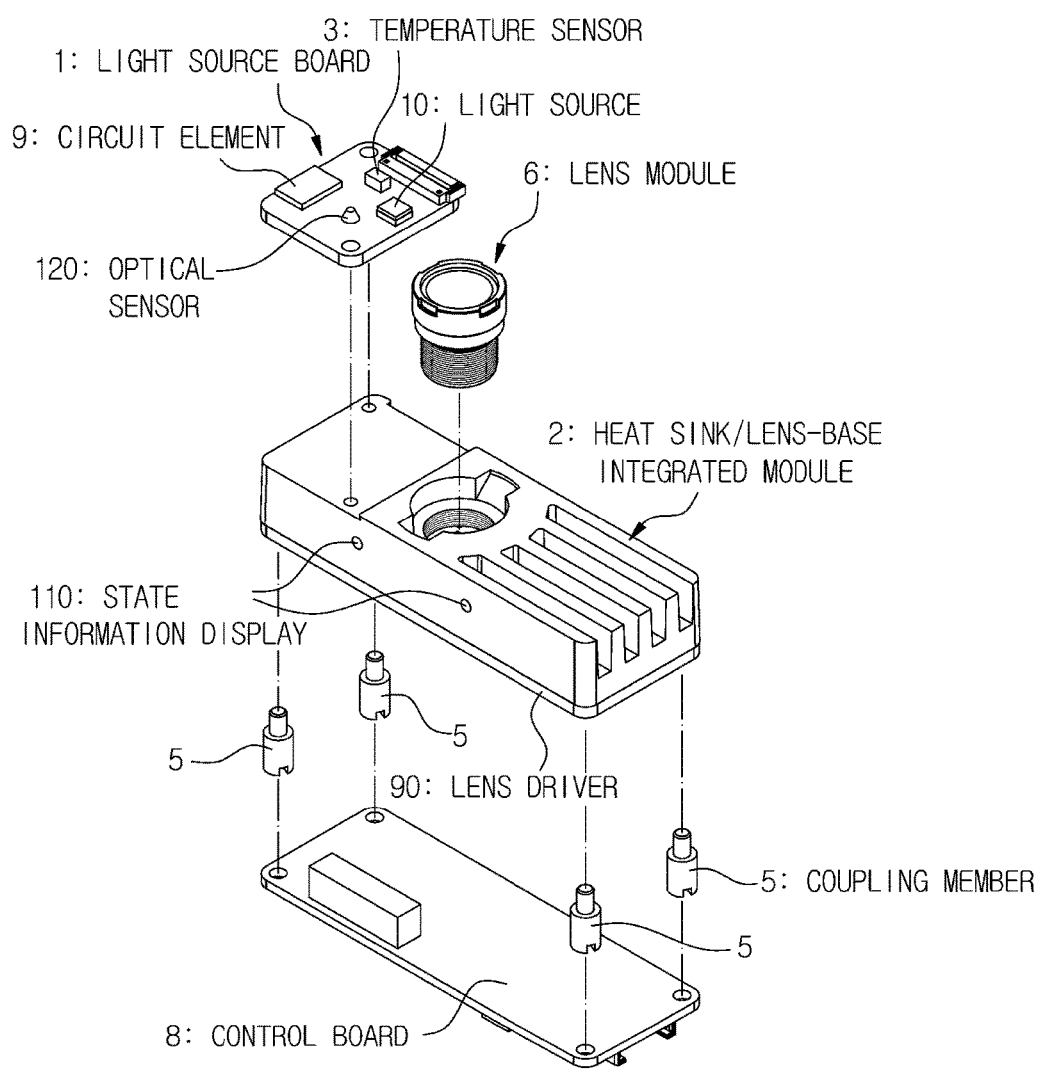
FIG. 9 is an exploded perspective view illustrating another example of the camera using a light source having a subject eye protection function according to one embodiment of the present invention.

FIGS. 8 and 9 are exploded perspective views each illustrating an example of the camera using a light source having a subject eye protection function according to one embodiment of the present invention.

Referring to FIGS. 8 and 9, a camera 1 using a light source having a subject eye protection function according to one embodiment of the present invention may include a light source 10 configured to emit light to a subject, a lens module 6 on which the light reflected by the subject is incident, a lens base 7 on which the lens module 6 is mounted, a light source board 1 on which the light source 10, a temperature sensor 3 which is adjacent to the light source 10 and is configured to measure a temperature, and an optical sensor 120 configured to measure the light therearound are mounted, a heat sink 4 on which the light source board 1 is mounted and which is configured to emit heat generated by the light source 10 and the like, a control board 8 on which a system controller 100 configured to control an overall operation of the camera, various circuit elements 9 such as a power supply 20, a current measurement unit 50, and a smoothing circuit 70, and the like are mounted, and coupling members 5 configured to couple the control board 8 and the heat sink 4. Particularly, in order to simplify a manufacturing process, improve a heat dissipation efficiency, and reduce a manufacturing cost, the heat sink 4 and the lens base 7 illustrated in FIG. 8 may be integrated such that the lens module 6 may be mounted on a heat sink/lens base integrated module 2 as illustrated in FIG. 9. Particularly, the light source board 1 on which the light source 10, the optical sensor 120, the temperature sensor 3, are the like are mounted may be mounted on one end portion of the heat sink/lens base integrated module 2, and a plurality of protrusions configured to maximize the heat dissipation efficiency by increasing an area in contact with air may be formed on the other end portion thereof. In addition, according to the embodiment illustrated in FIG. 9, the system controller 100, the various circuit elements 9, such as the power supply 20, the current measurement unit 50, and the smoothing circuit 70, and the like, may be mounted on a lower surface of both surfaces of the control board 8, which are not illustrated in the view unlike the embodiment illustrated in FIG. 8.

As described above in detail, the present invention has an effect of providing a camera using a light source having a subject eye protection function, which is capable of preventing a risk of the eyes of a human or the like who is a subject from being damaged due to an over-current introduced into a light source while a camera using a light source, such as a ToF camera, operates. In addition, since a reference value for interrupting the over-current is changed, subject information can be more accurately sensed and safety can also be further improved.

The invention claimed is:

1. A camera comprising:
    a light source driver installed between a power supply and a light source for emitting light to a subject and configured to convert electric power supplied by the power supply to a pulse current so that the pulse current is supplied to the light source;
    a current measurement unit configured to measure the pulse current supplied to the light source;
    an amplitude controller configured to control an amplitude of the pulse current measured by the current measurement unit;
    a smoothing circuit configured to smooth the pulse current of which the amplitude is controlled by the amplitude controller; and
    a comparator/controller configured to control the electric power supplied by the power supply to be interrupted in a case in which a smooth current smoothed by the smoothing circuit is greater than a predetermined threshold value.

2. The camera of claim 1, wherein the amplitude controller:
    compares the amplitude of the pulse current measured by the current measurement unit with a predetermined amplitude reference value; and
    in a case in which the amplitude of the pulse current is greater than the predetermined amplitude reference value, converts the amplitude of the pulse current to the predetermined amplitude reference value or less.

3. The camera of claim 1, further comprising a system controller configured to receive a state information, which includes comparison information between the smooth current and the threshold value, from the comparator/controller and monitor the state information.

4. The camera of claim 3, wherein the system controller controls the state information to be provided to a manager through a status information display or manager terminal.

5. The camera of claim 3, wherein, in a case in which the system controller receives the state information of the smooth current being greater than the threshold value, the system controller pushes alarm information for notifying an emergency situation with the state information to a designated manager terminal.

6. The camera of claim 3, wherein:
    the system controller is electrically connected to the light source;
    the light source is mounted on a light source board;
    the light source board is mounted on a heat sink; and
    the heat sink is coupled to a control board through a coupling member, wherein the system controller is mounted on the control board.

7. The camera of claim 6, wherein the light source board further includes at least one of an optical sensor or a temperature sensor.

8. The camera of claim 7, wherein the system controller receives information of a temperature from the temperature sensor to control the power supply.

9. The camera of claim 6, wherein the heat sink also serves as a lens base on which a lens module, on which light reflected by the subject is incident, is allowed to be mounted.

10. The camera of claim 9, wherein:
    the light source board is mounted on one side of the heat sink configured to also serve as the lens base; and
    a plurality of protrusions are formed on the other side thereof.

11. The camera of claim 3, wherein the system controller compares a clock signal for driving the light source driver with the pulse current measured by the current measurement unit to control the power supply.

12. The camera of claim 1, wherein the threshold value is changeable.

13. The camera of claim 12, wherein:
in a situation in which an amplitude of the smooth current increases, the threshold value is changed to increase; and
in a situation in which the amplitude of the smooth current decreases, the threshold value is changed to decrease.

* * * * *